INVENTORS.
Bernard E. Doherty
Harald C. Bjerke

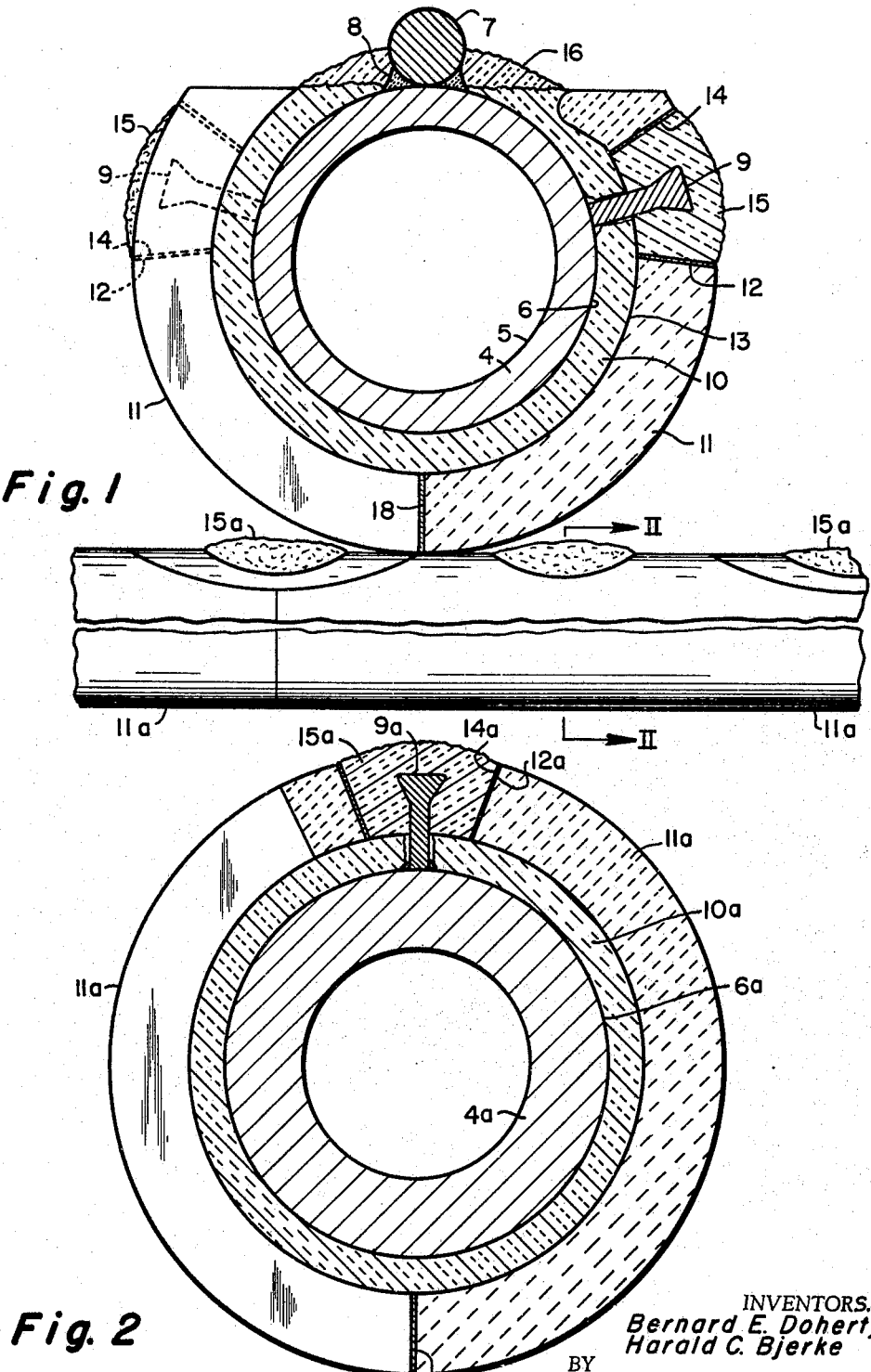

THEIR ATTORNEYS 3,486,533
PIPE INSULATION JACKET
Bernard E. Doherty, Pittsburgh, and Harald C. Bjerke, Bridgeville, Pa., assignors to Rust Furnace Company, Pittsburgh, Pa.
Filed Mar. 18, 1966, Ser. No. 535,376
Int. Cl. F16l 9/14, 59/12; F27d 3/02
U.S. Cl. 138—147    4 Claims

ABSTRACT OF THE DISCLOSURE

A water cooled pipe used as a skid in a furnace wherein the pipe is formed with refractory tile supporting studs on its exterior surface. A heat hardenable, plastic refractory material being applied to the studs to protect the studs from the fire. Tiles bearing against this heat hardenable material and being supported from said studs thereby. Parting materials may be interposed between the tiles and the heat hardenable material and a layer of insulating material may be sandwiched between said tiles and the exterior of the pipe.

---

This application relates to insulation for cooled pipes and particularly to refractory jackets for water-cooled pipes and a method of installing such jackets on water-cooled pipes.

In continuous furnaces, workpieces in the form of steel billets, slabs or blooms are pushed through the furnace on work-supporting rods or pipes known as skids which extend parallel to the path of the workpieces through the furnace. Conventionally, such work supports or skids are aligned in parallel with and structurally supported by a first row of water-cooled pipes. A second row of water-cooled pipes, transverse to and beneath those which carry the skids, completes the skid support framework.

As the workpieces are moved on the skids throughout the heating zones of the furnace, burners positioned below the workpieces throw flame upwardly between the support framework and against the bottom surfaces of the pieces. To prevent the pipes from weakening and sagging due to the high temperature, they are water cooled and protected by external insulation jackets. Since the temperature differential between the piece and the cooling water is substantial, usually on the order of 2200–2600° F., heat loss suffered by that portion of the workpiece adjacent the cooled pipe causes an unstable temperature condition near the bottom of the workpiece, which can be equalized only through conduction of heat from the top of the piece, or by the application of additional heat to the bottom of the workpiece.

To alleviate this condition, it has been the usual practice to insulate each water pipe, for example, by containing the pipe in precast metal reinforced refractory shapes, or by wrapping each pipe with a high-temperature insulating material and securing the material with temperature resistant wire. Using present methods, however, it has been found that, in addition to the vulnerability of a soft insulating material to mechanical damage, during thermal expansion and contraction of the sections, hairline cracks develop in the materials which enlarge due to furnace vibration and thermal shock until eventually the refractory spalls or falls off the pipe. Frequent and expensive repair or replacement of the refractory sections is required.

We have invented an insulation construction and method of installation thereof which overcomes the spalling problem by permitting sufficient relative movement between the cooled pipe and the refractory material to accommodate thermal expansion and contraction, incorporates maximum insulation and corrosion resistance qualities and provides easy, rapid, and positive attachment of the refractory to the cooled pipe.

In the accompanying drawings, we have illustrated certain presently preferred embodiments of our invention in which:

FIGURE 1 is a cross-sectional view of a heat-insulated, water-cooled conduit supporting a skid and embodying our invention.

FIGURE 2 is a cross-sectional view along the lines III—III of FIGURE 1 of a heat-insulated, water-cooled conduit which extends laterally beneath and supports the skid pipe.

Figure 3:
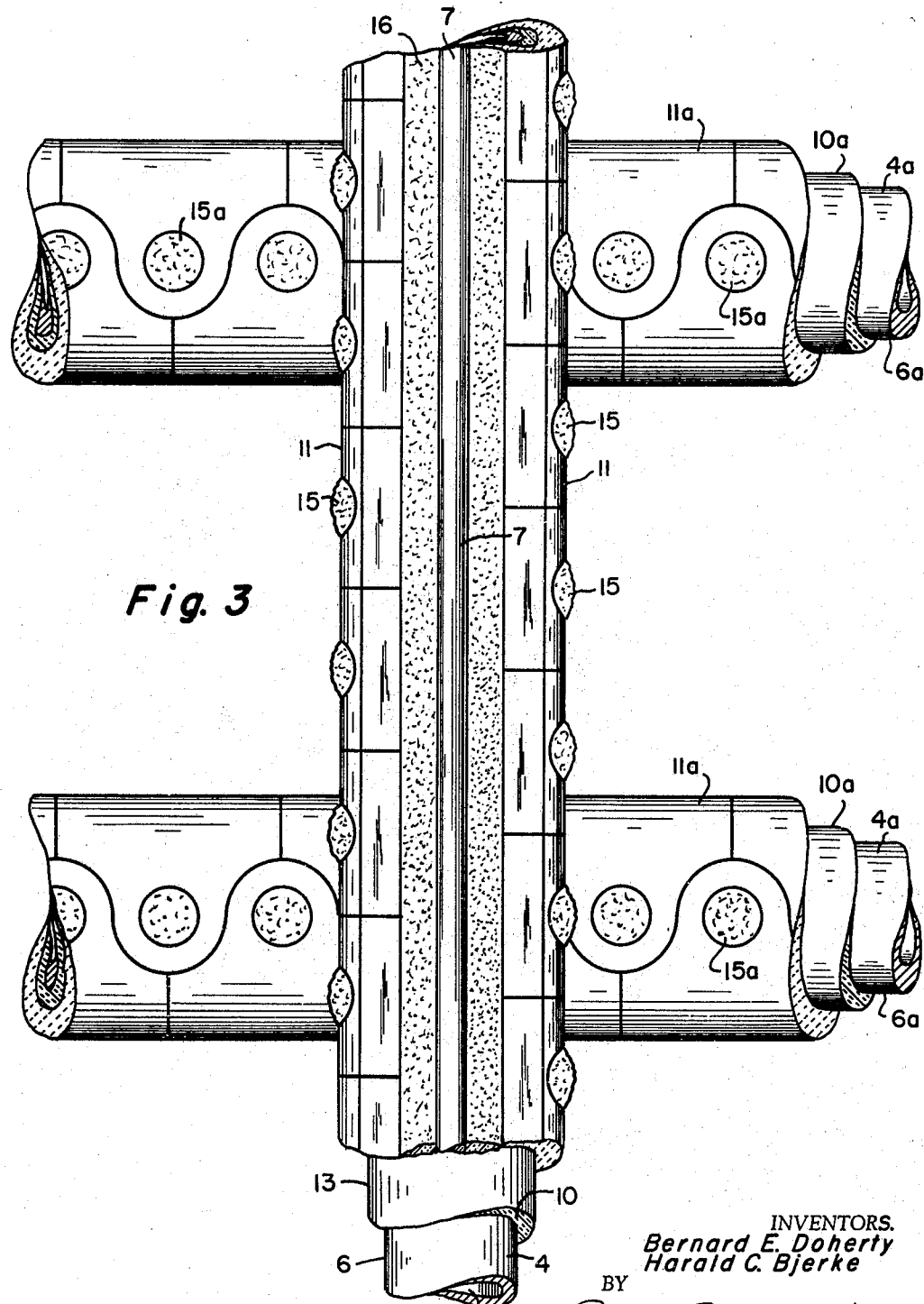
FIGURE 3 is a reduced plan view showing the completed jacket embodying our invention.

Referring to FIGURE 1, there is illustrated a water-cooled pipe 4 having an inner wall 5 and an outer wall 6. A skid 7 for supporting a workpiece (not shown) is attached by weld 8 to the outer wall 6 at top center of the pipe 4. A key-shaped stud 9 secured at one end to the outer wall 6 extends outwardly from the outer wall 6. A layer 10 of suitable insulation material surrounds the outer wall 6 except for that portion of the wall adjacent the skid 7. The insulation may be rock wool, silicon oxide, or aluminum oxide fibers. The stud is located in the first or fourth quadrants of the pipe wall, that is, above the central axis of a section, such as FIGURE 1) taken through the pipe, to support a preshaped, prefired refractory tile 11.

The layer of insulation material 10 is applied to a depth sufficient to cover fully the outer wall 6 of the pipe, yet permit a portion of the stud 9 to protrude through the insulation. The refractory tile 11, of curved shape and having an enlarged opening 12 therein at approximately the same portion of the same quadrant as the stud 9, fits over and surrounds outer surface 13 of the insulation material 10, the opposite end of the stud 9 extending into opening 12. The cross-sectional area of the opening 12 is much greater than the cross-section of the stud 9. Generally, such preformed tiles are approximately one foot in length and cover about one-half of the curved surface of the water-cooled pipe. Complementary tiles of identical construction cover the other half of the pipe surface. A number of such tiles axially disposed on the pipe cover the entire length of the pipe.

The wall of the opening 12 is lined with a parting agent 14 and the opening is filled with pliable refractory material 15 which surrounds and covers the stud 9. During the heating cycle the pliable refractory material hardens but it does not bond to the wall of the opening because of the parting agent. The parting agent may be a lining of combustible material which is burned off during the heating cycle leaving a small space between the wall of the opening 12 and the hardened refractory material 15 except along those areas where the wall contacts the refractory material for support of the tile 11. This permits relative movement between the refractory tile and the hardened refractory material 15 during thermal expansion and contraction of the insulation jacket.

The pliable refractory material may be a castable refractory or a plastic refractory. In either case, the material, when applied around a stud and within an opening in the tile is a relatively stiff working mixture which can be molded into the opening but which will "air-set" with sufficient speed to support the tile on the pipe. Subsequently, when the furnace is fired it further hardens and obtains its full strength.

The weld 8 between the skid 7 and the pipe 4 may also be joined and covered with a pliable refractory material 16 to prevent heat transfer at that point.

To provide a continuous skid pipe covering, the installation just described is repeated along the length of a pipe by placing studs on the pipe surface approximately in line in both the first and fourth quadrants and locating the preformed refractory tile so that the opening in each tile surrounds a stud, the bottom edges 18 of opposing refractory tiles joining at a point where, if desired, the tile edges may be bonded together. As shown in FIGURE 1, the tiles are joined at bottom center so that uniform half sections may be utilized on both sides of the skid.

In FIGURE 2, we show a modified form of our invention which is generally similar to that shown in FIGURE 1 and therefore the same reference numerals are used with the suffix $a$ added. Since pipe 4a, being a support for the pipe 4 shown in FIGURE 1, has no skid, the stud 9a shown in FIGURE 2 is positioned at top center of the outer wall 6a of pipe 4a to secure the layer of insulation material 10a and the refractory tile 11a to the pipe. In this embodiment, a parting agent 14a is applied to the wall of the opening 12a before the opening is filled with the pliable refractory material 15a.

By alternating uniform refractory tiles 11a of sufficient circumference to surround more than 180° of the pipe, we are able to insulate an entire pipe length, as shown in FIGURE 3. The studs are located approximately in line along the top of the pipe 4a, the insulation material 10a is impaled on the studs, and sections 11a are hung over the studs by surrounding the studs with the openings in the refractory tiles. By lining the wall of the opening in each tile with a parting agent which prevents the pliable refractory material from bonding to the tile when the material hardens and by covering the stud with the pliable refractory material, vibration induced in the pipe is not transmitted to the tile and there may be relative thermal movement between the pipe and the tile. FIGURE 3 also shows the alternate disposition of the refractory tile 11 and the pipe 4.

This method of installation does not require, as do some techniques for insulating furnace pipes used now, highly accurate measurement between studs and refractory tiles. For example, in a few installations now employed, jigs must be moved along the pipe to align the studs during installation and repair of the jackets, a time-consuming and expensive operation.

As is evident from the foregoing description, in our construction the stud need not be positioned accurately on the outer wall of the pipe, nor must the opening in the refractory tile be toleranced perfectly, as in earlier insulation techniques, making our installation method both inexpensive and effective. Moreover, the key-shaped stud of our preferred embodiment may be replaced by any acceptable stud configuration. All that is required is that the stud extend outwardly from the pipe and into the enlarged opening in the refractory tile, so that a plug of pliable refractory material may be formed to secure the tile on the pipe.

Our insulation jacket effectively prevents harmful heat transfer between a heated workpiece and the cooled pipe supports for the skids, decreasing the possibilty of cold spots occurring in the workpiece. Since our construction provides for sufficient movement upon thermal expansion and contraction between the jacket and the pipe, mechanical stresses within the jacket which lead to spalling are minimized, eliminating the need for frequent repair of the refractory jacket.

Our insulation jacket may be used to protect from heat surfaces other than those of pipes; for example, the inside surface of a furnace door.

While we have described presently preferred embodiments of our invention, it is to be understood that it may be otherwise embodied within the scope of the appended claims.

We claim:
1. An insulation jacket for a water-cooled pipe, said pipe having an outer wall, said jacket comprising:
   a tile of refractory material extending at least partially around said outer wall of said pipe, said tile having an opening therein provided with a first transverse dimension;
   a stud having a first end secured to said outer wall, said stud having a tile support surface extending outwardly thereon into said opening, said surface defining a second transverse dimension smaller than said first dimension to provide a space between said support surface and the wall of said opening; and
   a heat hardenable refractory material in said space between said surface of said stud and said walls, said heat hardenable material having a tile support area engaging said support surface to mount said tile to said stud.

2. An insulation jacket according to claim 1 wherein a layer of parting agent is secured to the wall of said opening between said tile and said heat hardenable refractory material, said agent being a combustible material.

3. An insulation jacket according to claim 1 wherein a layer of insulation material is interposed between said tile and the outer wall of said pipe.

4. An insulation jacket for a water-cooled pipe, said pipe having an outer wall, said jacket comprising:
   a layer of insulating material surrounding the outer wall of the pipe;
   a tile of refractory material mounted over said layer, said tile having an opening therein;
   a stud having a first end secured to said outer wall and a tile support surface extending through said layer into said opening, said surface being smaller than said opening to provide a relatively wide space between said surface and the wall of said opening;
   a parting agent lining the wall of said opening; and
   a heat hardenable refractory material received in the space between said agent and said surface of said stud, said heat hardenable material contacting the parting agent and having a tile support area engaging said support surface to retain said tile on said stud.

References Cited

UNITED STATES PATENTS

| 741,629 | 10/1903 | Cowan. | |
| 1,885,800 | 11/1932 | Burnet | 110—99 |
| 2,436,452 | 2/1948 | Schmidt. | |
| 3,169,754 | 2/1965 | O'Reilly | 138—147 X |
| 3,346,248 | 10/1967 | Martinet et al. | 110—99 X |

FOREIGN PATENTS

| 455,886 | 2/1928 | Germany. |
| 473,933 | 3/1929 | Germany. |

LAVERNE D. GEIGER, Primary Examiner

EDWARD J. EARLS, Assistant Examiner

U.S. Cl. X.R.

138—149; 263—6